United States Patent
Onomatsu

(10) Patent No.: US 8,291,449 B2
(45) Date of Patent: Oct. 16, 2012

(54) DIGITAL BROADCAST RECEPTION APPARATUS WITH AN IMPROVED FUNCTION TO SWITCH CONTENT OUTPUT AND METHOD OF SWITCHING CONTENT OUTPUT

(75) Inventor: Takehiro Onomatsu, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 2839 days.

(21) Appl. No.: 10/830,345

(22) Filed: Apr. 22, 2004

(65) Prior Publication Data

US 2004/0216167 A1 Oct. 28, 2004

(30) Foreign Application Priority Data

Apr. 25, 2003 (JP) .............................. 2003-122362(P)

(51) Int. Cl.
*G06F 3/00* (2006.01)
*G06F 13/00* (2006.01)
*H04N 5/445* (2011.01)

(52) U.S. Cl. ........................... 725/37; 725/134; 725/142

(58) Field of Classification Search ................... 725/40, 725/134, 142, 37, 131, 13
See application file for complete search history.

(56) References Cited

U.S. PATENT DOCUMENTS

2003/0231864 A1* 12/2003 Wakahara ........................ 386/68

FOREIGN PATENT DOCUMENTS

| JP | 2000-175140 | * | 2/1998 |
| JP | 10-257449 | | 9/1998 |
| JP | 11-8807 | | 1/1999 |
| JP | 2000-287179 | * | 3/1999 |
| JP | 2000-175140 | | 6/2000 |
| JP | 2000-287179 | | 10/2000 |
| JP | 2002-262225 | | 9/2002 |
| JP | 2002-290887 | | 10/2002 |
| JP | 3090788 | | 10/2002 |

OTHER PUBLICATIONS

Takehiro Onomatsu, Digital Combination and Reproduction Apparatus, Utility Model Registration No. 3090788.*
Patent Abstracts of Japan, Publication No. 2002-290887, Date of Publication: Oct. 4, 2002, 1 page.
Patent Abstracts of Japan, Publication No. 11-008807, Date of Publication: Jan. 12, 1999, 1 page.
Patent Abstracts of Japan, Publication No. 2002-262225, Date of Publication: Sep. 13, 2002, 1 page.

(Continued)

*Primary Examiner* — Brian Pendleton
*Assistant Examiner* — Nnenna Ekpo
(74) *Attorney, Agent, or Firm* — Osha Liang LLP

(57) ABSTRACT

A digital tuner equipped with a recording media reproduction device outputs digital content to an externally connected monitor device. The digital content includes digital content obtained by receiving a digital broadcast signal via a tuner and digital content previously recorded in a HD device and read therefrom. Whenever a user operates a remote controller to performs a common operation via a key to select and switch digital content to be output to the monitor device, digital content provided by a digital broadcast signal or that recorded in the HD device is sequentially selected. The selected digital content is obtained by the tuner or the HD device and provided to a decoder. The decoder receives and decodes the digital content and outputs it to the monitor device.

11 Claims, 5 Drawing Sheets

OTHER PUBLICATIONS

Patent Abstracts of Japan, Publication No. 10-257449, Date of Publication: Sep. 25, 1998, 1 page.

Japanese Notice of Ground of Rejection for Japanese patent application No. 2003-122362, mailed Feb. 28, 2006, and English translation thereof, 5 pages.

Partial mechanical translation of Utility Model Registration No. 3090788, Registration Date; Oct. 9, 2002, corresponding to Utility Model Application No. 2002-3666, filed Jun. 17, 2002, 2 pages.

Patent Abstracts of Japan, Publication No. 2000-175140, Publication Date: Jun. 23, 2000, 1 page.

Japanese Office Action for Japanese Application No. 2003-122362, mailed on May 22, 2007, and English translation thereof (3 pages).

Patent Abstracts of Japan for Japanese Publication No. 2000-287179, Publication date Oct. 13, 2000 (1 page).

* cited by examiner

FIG.3

|  | D1 |  | D2 |
|---|---|---|---|
| CH | 1-0 | on | AIR |
| CH | 2-1 | on | AIR |
| CH | 2-2 | on | AIR |
| CH | 12-0 | on | AIR |
| CH | 20-1 | on | AIR |
| AUX | -1 | AUX | input |
| AUX | -2 | AUX | input |
| Program | 1 | from | HDD |
| Program | 2 | from | HDD |
| Program | 3 | from | HDD |
| Program | 4 | from | HDD |
| ⋮ |  | ⋮ |  |

31

⇑ UR
← CR
⇓ DR

DIGITAL BROADCAST RECEPTION APPARATUS WITH AN IMPROVED FUNCTION TO SWITCH CONTENT OUTPUT AND METHOD OF SWITCHING CONTENT OUTPUT

BACKGROUND OF THE INVENTION

1. Field of the Invention

The present invention relates generally to digital broadcast reception apparatuses and methods of switching content output and particularly to digital broadcast reception apparatuses with an improved function to switch content output and methods of switching content output.

2. Description of the Background Art

Digital broadcast signal reception apparatuses incorporating a hard disk recording and reproduction device have conventionally been provided. For such apparatuses when a user desires to output content, whether to obtain the content by reproducing it from a hard disk or receiving a digital broadcast signal must selectively be designated. A method therefore is disclosed in Japanese Patent Laying-Open No. 2002-290887. More specifically, a list of broadcast programs having been reserved and recorded to a hard disk is displayed. From the list a user selects a desired, recorded program and presses an Enter key of a remote controller. In response, a monitor displays a guide of programs scheduled to be broadcast. The user refers to the guide to designate a desired program. Furthermore, Japanese Patent Laying-Open No. 11-8807 discloses providing enhanced operability to select a channel by displaying a channel list including channel numbers, channel names and the like to help a user to perform an operation to select a channel.

Furthermore, Japanese Patent Laying-Open No. 2002-262225 discloses that in response to a request by a user, stored contents are displayed in a list together with their dates and times, channels and the like. Furthermore, Japanese Patent Laying-Open No. 10-257449 discloses displaying guide information for all programs stored in a storage device.

Thus conventionally when a user desires to view stored content the user needs to additionally press a specific key invoking "displaying a list of titles of programs to be reproduced" and then perform an operation to select desired content from the list. This results in a remote controller having a group of keys used for example to display a menu and designate a title of a program to be displayed. Such keys are unfamiliar to users and thus force the user to perform a cumbersome operation, resulting in poor operability.

SUMMARY OF THE INVENTION

The present invention contemplates a digital broadcast reception apparatus allowing a user to perform a simple operation to designate content that the user desires to output, and methods of switching content output.

To achieve the above object the present invention in one aspect provides a digital broadcast reception apparatus including: a broadcast receiver receiving a digital broadcast signal; a recording medium having content previously recorded therein; a content reader reading the content from the medium; a switch operated to switch content to be output to a previously prepared monitor; and a controller controlling switching content to be output, sequentially switching and selecting from a group of contents content to be output to the monitor whenever the switch is operated, the group of contents at least including content broadcast through each of at least one channel allowing the broadcast receiver to receive a corresponding digital broadcast signal, and content recorded in the medium.

Thus an operation performed to select and switch content to be output to a monitor that is provided by a digital broadcast signal and an operation performed to select and switch content to be output to the monitor that is recorded in a recording medium can be rendered common by an operation of the switch.

Whether content that a user desires to output to the monitor may be that provided by a digital broadcast signal or that recorded in a medium, the content can be designated simply by operating the switch.

Preferably the present apparatus further includes a register having registered therewith identification information identifying each of at least one channel of the digital broadcast signal, and identification information identifying each of at least one content recorded in the medium. The controller includes a selector, and whenever the switch is operated the selector sequentially selects the identification information in the register and outputs the identification information selected. The broadcast receiver includes a broadcast content extractor, and when the extractor receives the identification information from the selector the extractor extracts the digital broadcast signal received that indicates content broadcast through the channel identified by the identification information input. When the content reader receives the identification information from the selector, the content reader reads from the medium the content identified by the identification information input.

Whenever the switch is operated, the controller sequentially selects identification information previously registered with the register to switch and thus select content to be output and the controller provides the selected identification information to the content reader or the broadcast content extractor that can supply corresponding content.

Thus, whether content that a user desires to output to the monitor may be that provided by a digital broadcast signal or that recorded in a recording medium, previously registering with a register information identifying the content allows content to be that which can be output to the monitor by simply operating the switch.

Preferably the selector is driven by selected identification information to output the identification information to either the broadcast content extractor or the content reader. The selected identification information is thus provided to a subject that can obtain content corresponding to the identification information, i.e., one of the broadcast content extractor and the content reader.

Preferably the present apparatus further includes a monitor output portion receiving and outputting to the monitor the content extracted by the extractor or the content read by the reader from the medium.

Whenever a user operates the switch to switch and thus select content, switched, new content can be output to the monitor.

Preferably the present apparatus outputs information to the monitor for specifying whether content output by the monitor output portion to the monitor has been extracted from a digital broadcast signal or read from a medium.

Whenever a user operates the switch the monitor receives content switched and output as well as information specifying it. It can rapidly be determined whether content currently output to the monitor is that obtained by receiving a digital broadcast signal or that previously recorded in a medium and read therefrom.

Preferably the information specifying includes the identification information of the content being output to the monitor. This can inform a user that when a channel's identification information is output, content being output to the monitor is content being received from a digital broadcast signal, and that otherwise it is content read from a recording medium.

Preferably the register has additional information registered therewith to identify externally supplied content, and the present apparatus further includes a portion receiving external content. When the portion receiving external content receives identification information output from the controller it receives externally supplied content identified by the received information and outputs the content to the monitor.

Thus, content selectively switched by an operation of the switch and output to the monitor can include that externally supplied to a digital broadcast reception apparatus having a content recording medium.

Preferably the medium includes a hard disk. Thus, content selectively switched by an operation of the switch and output to the monitor can include that previously recorded in a hard disk and that received via a digital broadcast signal.

Preferably the medium includes a digital versatile disk (DVD). Thus, content selectively switched by an operation of the switch and output to the monitor can include that previously recorded in the DVD and that received via a digital broadcast signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows specifically by way of example a channel map recorded in accordance with the present invention in an embodiment.

DESCRIPTION OF THE PREFERRED EMBODIMENTS

Figure 1:
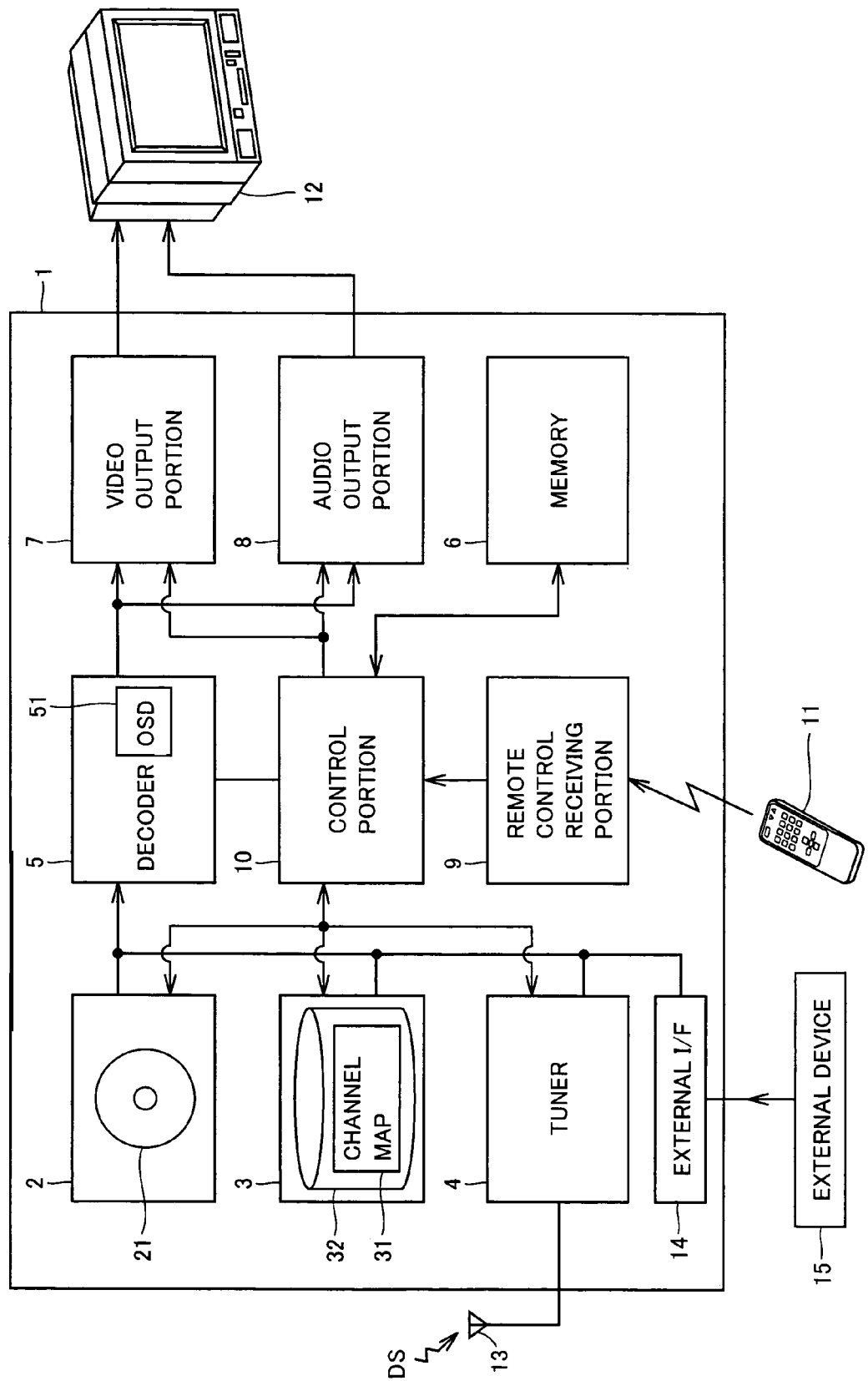
FIG. 1 shows a configuration of a digital tuner equipped with a recording media reproduction device in accordance with the present invention in an embodiment.

Hereinafter the present invention in embodiment will be described with reference to the drawings. "Content" as described herein includes audio, video character and other information. With reference to FIG. 1, a digital tuner 1 equipped with a recording media reproduction device (hereinafter simply referred to as "the digital tuner (1)") incorporates a device reproducing a plurality of types of digital recording media, and to allow a user to view content reproduced from each recording medium and other similar various contents digital tuner 1 outputs the content in a video or audio signal to a monitor device 12 previously connected external to digital tuner 1.

Digital tuner 1 includes a DVD reproduction device 2 reading and reproducing digital information from an incorporated DVD 21, a hard disk device 3 incorporating a hard disk 32, and recording digital information to hard disk 32 and also reading and reproducing content of the digital information from hard disk 32, a tuner 4 having an external antenna 13 connected thereto to receive a digital broadcast signal DS transmitted from a broadcast station, a decoder 5 incorporating an on screen display (OSD) 51, a memory 6, a video output portion 7, an audio output portion 8, a remote control receiving portion 9, a control portion 10 formed by a microcomputer, a remote controller 11, and an external interface (I/F) 14 connecting an external device 15 operating to supply digital tuner 1 with external digital information.

DVD reproduction device 2 reads (reproduces) a signal of digital content recorded in DVD 21 provided in the form of an optical disk. Herein, "digital content" refers to content in digital form. HD device 3 records to hard disk 32 a signal of digital content desired by a user and reads the signal of the digital content recorded. Herein, hard disk 32 records signals for example of a video file in conformity with Motion Picture Experts Group 2 (MPEG 2) and an audio file in conformity with MPEG-1 Audio Layer 3 (MP3).

When tuner 4 receives via antenna 13 digital broadcast signal DS transmitted from a broadcasting station, tuner 4 extracts from signal DS a signal broadcast through a channel designated by control portion 10 (a signal of digital content) and outputs the extracted signal.

When decoder 5 receives a signal of digital content reproduced by DVD reproduction device 2, a signal of digital content read by HD device 3 from the hard disk 32, a signal of digital content extracted by tuner 4, or a signal of digital content received from external device 15 through external I/F 14, as switched as controlled by control portion 10, decoder 5 decodes and outputs the signal of the digital content. Decoder 5 incorporates OSD 51, which is driven by information received from control portion 10 to generate image data and output the data to video output portion 7 to visibly display it on a screen of monitor device 12.

Memory 6 stores a broadcast channel receivable by tuner 4, obtained through a previous channel scan (auto scan), and memory 6 also stores a variety of programs executed by the microcomputer of control portion 10. Audio output portion 8 receives an audio signal decoded by decoder 5, converts the signal to an audio signal that can be output by monitor device 12, and outputs the converted audio signal to monitor device 12. Remote control receiving portion 9 receives a variety of command signals transmitted from remote controller 11 through an infrared ray, and outputs the received signal to control portion 10. Control portion 10 controls and monitors each portion in accordance with a program stored in memory 6. Remote controller 11 is operated by a user to input a variety of commands. Remote controller 11 transmits an infrared signal corresponding to a command input.

Figure 2:
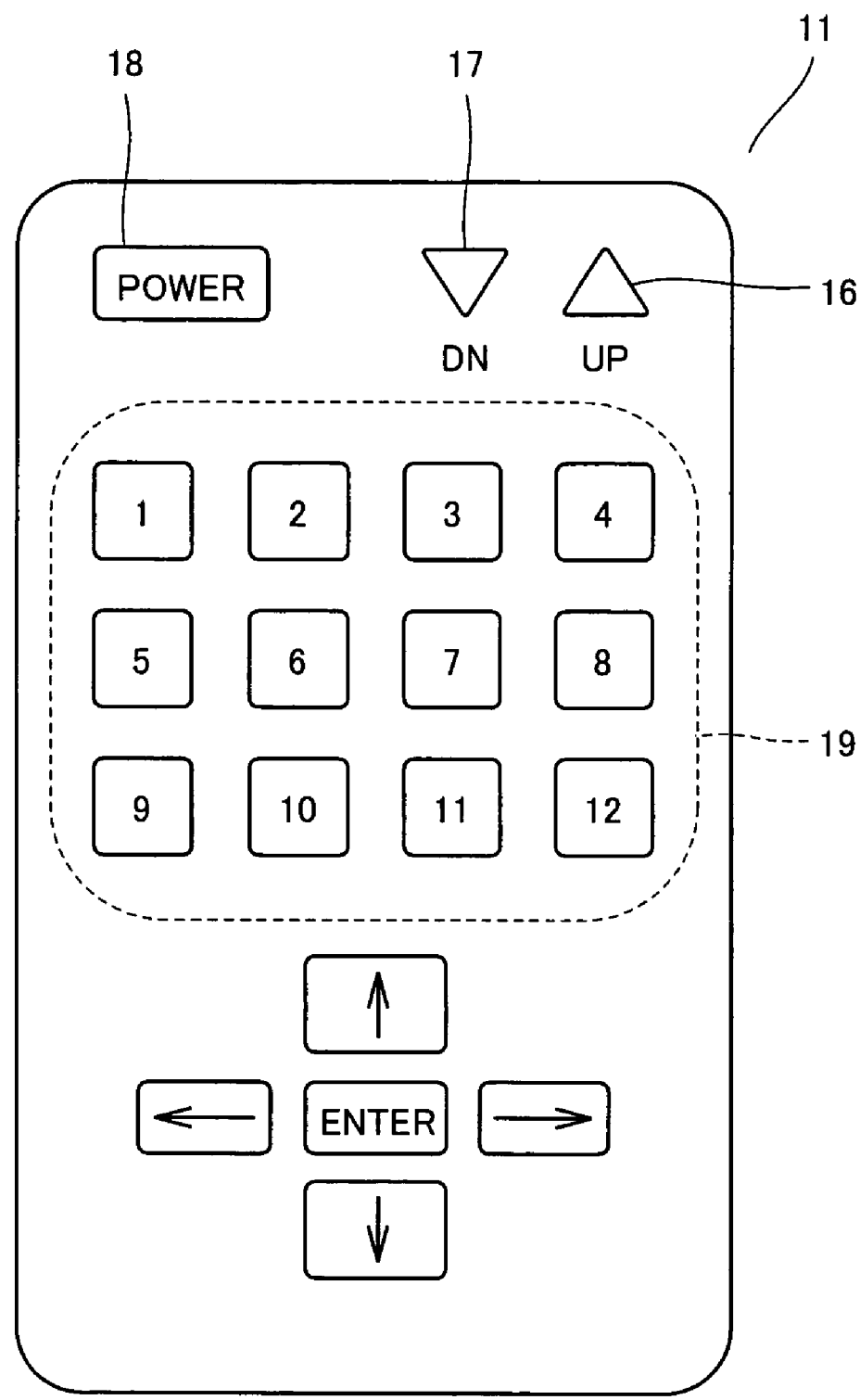
FIG. 2 shows by way of example an arrangement of keys of a remote controller in accordance with the present invention in an embodiment.

With reference to FIG. 2, remote controller 11 has various keys to allow external operation. The keys include keys 16, 17 operated to switch and thus designate content to be displayed on monitor device 12, a key 18 operated to power on/off digital tuner 1, and numeral keys 19 operated designate a channel number to select individually and thus switch a channel receiving digital broadcast signal DS. Keys 16 and 17 are operated to perform an UP/DOWN operation sequentially switching and thus designating a channel receiving signal DS and also sequentially switch and thus designate digital content to be output to monitor device 12.

The HD device 3 hard disk 32 has various digital contents as well as a channel map 31 previously stored therein. With reference to FIG. 3, channel map 31 has records registered therewith in a prescribed order. The records correspond to a plurality of types of digital contents, respectively, that can be output at monitor device 12 via digital tuner 1. In this example, a record of digital information (or digital content) by digital broadcast signal DS, a record of digital information (or digital content) received from external device 15, and a record of digital information (or digital content) previously stored in HD device 3 are successively registered, although the records may be registered in a different order. Note that the channel map 31 digital content may include digital content of DVD 21 of DVD reproduction device 2.

A record of digital content is information for identifying the content, and it includes data D1 and D2 correlated to each other. For digital content of a channel of digital broadcast signal DS that is received by digital tuner 1, data D1 is assigned a name such as "CH-0," "CH-1" . . . or the like to specify a channel receiving a broadcast signal of the digital content. For digital content received from external device 15, data D1 is assigned a name such as "AUX-1," "AUX-2" to specify an external input. For digital content previously stored in HD device 3 at hard disk 32, a file name such as "Program 1," "Program 2", . . . or the like produced in recording (including recording in deleting or dividing a file) that is information recorded in hard disk 32 at a prescribed location and specifying the digital content, is read and assigned to data D1.

A name of a channel receiving a signal is obtained by previously performing in digital tuner 1 a channel scan (an auto-scan) setting a channel capable of receiving digital broadcast signal DS and the obtained channel name is registered with channel map 31 for the sake of illustration.

Data D2 is assigned "ON AIR" if data D1 corresponding thereto is a channel receiving digital broadcast signal DS. The broadcasting station transmitting digital broadcast signal DS is thus indicated as a source supplying digital content. Similarly, if corresponding data D1 indicates a name of an external input, then "AUX input" is assigned to indicate that external device 15 supplies corresponding digital content. Similarly, if corresponding data D1 indicates a name of a file of digital content recorded in HD device 3 at hard disk 32 then "from HDD" is assigned to indicate that corresponding digital content is read and supplied from hard disk 32.

Channel map 31 is referenced (or accessed) by control portion 10 to select digital content that the user desires to output to monitor device 12. More specifically, whenever the remote controller 11 key 16 or 17 is pressed, control portion 10 switches and thus selects digital content to be output to monitor device 12. For example, with reference to FIG. 3, the digital content indicated by an arrow CR is currently selected and output to monitor device 12 for the sake of illustration, and whenever a user, desiring to switch digital content to be output, presses key 16, control portion 10 exerts control to switch and thus select digital content to be output, in a direction DR, one at a time, and output the selected digital content to monitor device 12. By contrast, whenever key 17 is pressed, control portion 10 exerts control to switch and thus select digital content to be output, in a direction UR, one at a time, and output the selected digital content to monitor device 12.

Whenever key 16, 17 is pressed, channel map 31 can be referenced to sequentially switch and select digital content to be output to monitor device 12 to output the digital content to monitor device 12. In doing so, control portion 10 switches a signal provided to decoder 5 in accordance with information designating a source supplying content indicated by data D2 corresponding to digital content selected. More specifically, if corresponding data D2 indicates "ON AIR" control portion 10 switches to provide decoder 5 with a signal output from tuner 4. For "AUX input" control portion 10 switches to provide a signal output from external I/F 14. For "from HDD" control portion 10 switches to provide a signal output from HD device 3.

After it has switched, control portion 10 identifies digital content indicated by data D1 of the record of the digital content of interest and controls a source indicated by corresponding data D2 to derive digital content indicated. More specifically, when a signal is switched to a signal output from tuner 4, control portion 10 controls tuner 4 to receive a signal broadcast through a channel indicated by data D1. If a signal is switched to a signal output from external I/F 14, then control portion 10 controls external I/F 14 to receive a signal provided from external device 15. If a signal is switched to a signal output from HD device 3, then control portion 10 controls HD device 3 to read from hard disk 32 the digital information corresponding to a name of digital content indicated by data D1.

Figure 4A:
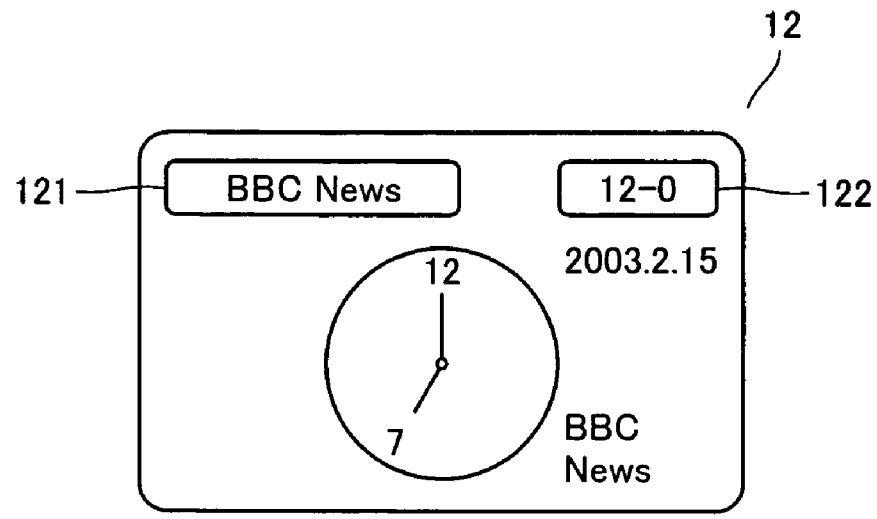
FIGS. 4A and 4B show by way of example screens displayed by a monitor device.
Figure 4B:
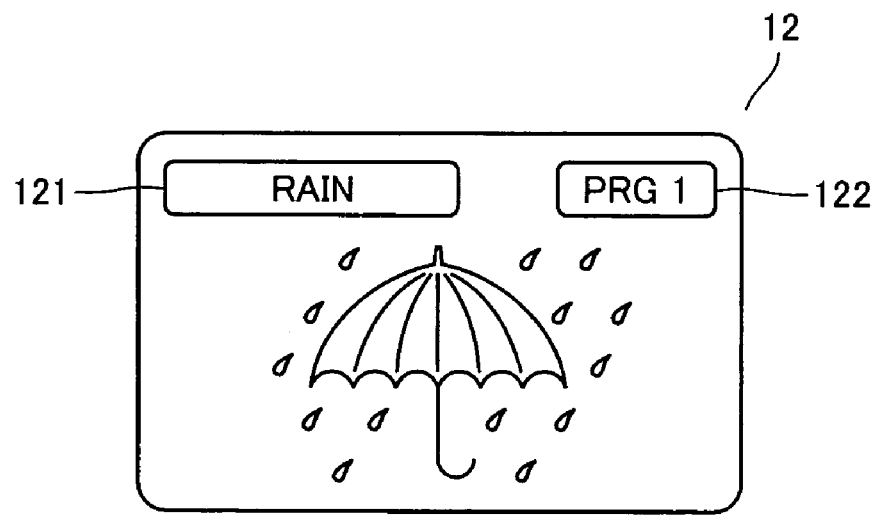

FIGS. 4A and 4B show by way of example screens displayed by monitor device 12. FIG. 4A shows a screen displayed when digital broadcast signal DS is selected as digital content to be output to monitor device 12. FIG. 4B shows a screen displayed when digital information recorded in HD device 3 at hard disk 32 is selected.

In FIG. 4A, together with an image and sound of digital content provided by digital broadcast signal DS, information that identifies the digital content is indicated by OSD 51. More specifically, a single screen has portions 121 and 122 indicating a title of a broadcast program provided by the digital content, and a name of a channel receiving it, respectively. The title is included in broadcast signal DS, and thus transmitted from a broadcasting station and received, and control portion 10 can obtain it from the received broadcast signal and display it via OSD 51. The channel name can be displayed as control portion 10 reads data D1 from channel map 31 and display it via OSD 51. This is convenient as the user can obtain a channel number switched, a title of a broadcast program and the like.

In FIG. 4B, together with a displayed image and an output sound provided by digital content read from HD device 3, information that identifies the digital content is displayed by OSD 51. More specifically, the digital content's name (or title) and an index number specifying the content in hard disk 32 are obtained by control portion 10 via HD device 3 and in accordance with the obtained information they are displayed by OSD 51 on a single screen at portions 121 and 122, respectively. These items of information are read from hard disk 32 at a prescribed location and thus obtained. Portion 122 displays an index number, which may be replaced by an icon indicating that the content has been read from hard disk 32. Thus when digital content read by HD device 3 from hard disk 32 is to be output, information (image, sound) of the content is output and a name (a title), an index number and the like that specify the content can also be displayed. The user can rapidly confirm whether digital content that he/she views is that as desired or not.

When the FIGS. 4A and 4B screens are referenced, by confirming the information of portion 121 and that of portion 122 the user can determine at a glance whether digital content currently selected and output to monitor device 12 is obtained by selecting a channel of digital broadcast signal DS or selecting digital content recorded in hard disk 32.

Figure 5:
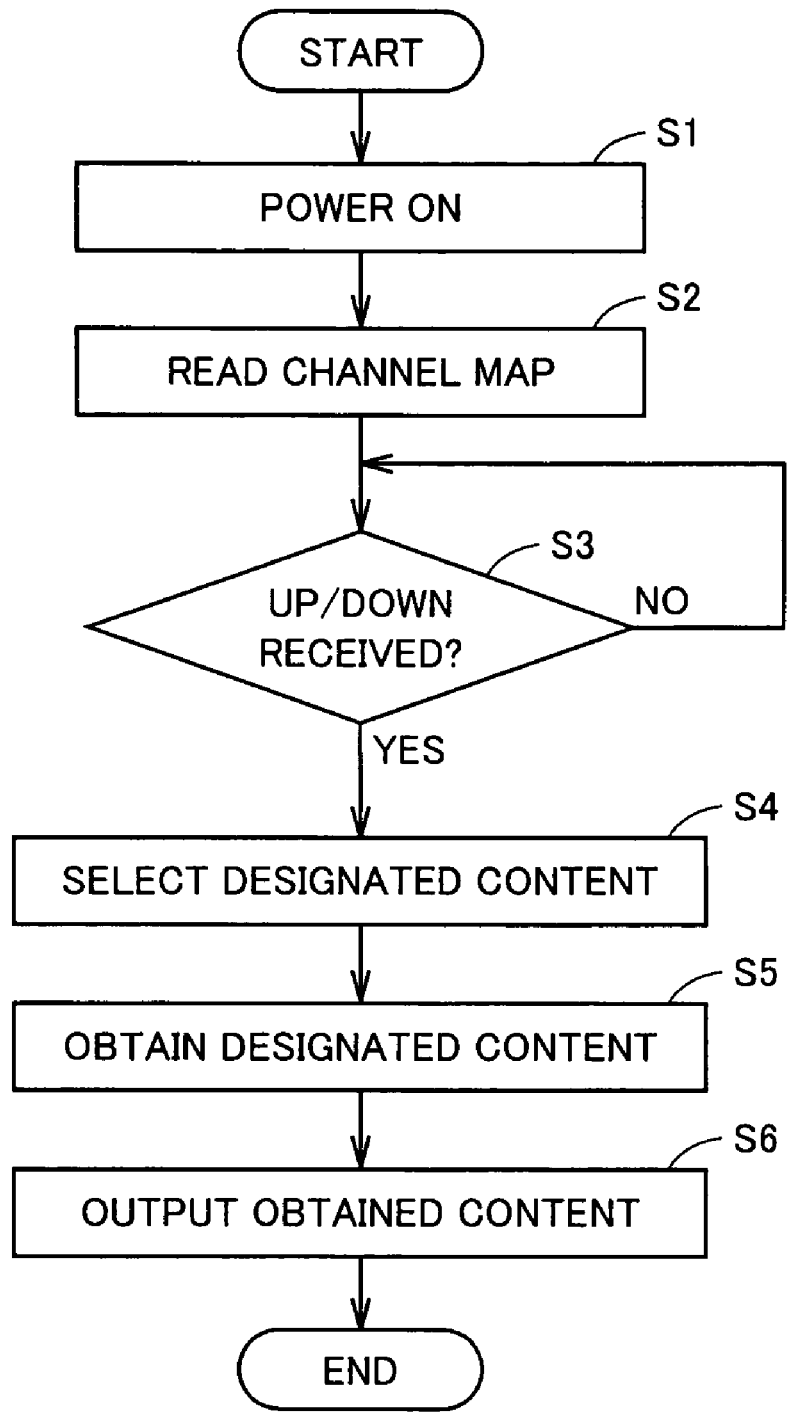
FIG. 5 is a flow chart representing a procedure performed to switch and select content in accordance with the present invention in an embodiment.

Reference will now be made to the flow chart of FIG. 5 to describe a procedure followed to select and switch content with reference to channel map 31.

When the remote controller 11 key 18 is pressed, a command signal associated therewith is provided via remote control receiving portion 9 to control portion 10. Control portion 10 supplies each component of digital tuner 1 with power from a commercial power supply (not shown) (step (S) 1).

Control portion 10 then reads channel map 31 from HD device 3 (S2). Subsequently control portion 10 determines from a command signal received from remote control receiving portion 9 whether the user has pressed key 16 or 17 (S3).

Currently, in channel map 31, as indicated by arrow CR (see FIG. 3), the content with data D1 of "Program 2" is indicated and output to monitor device 12 for the sake of illustration, and when the user presses key 16, the current content to be output to monitor device 12, as indicated by arrow CR, is switched to the immediately adjacent data with "Program 1," as seen in the upward direction UR. Furthermore, whenever key 16 is pressed, the content immediately adjacent to the current content, as seen upward, is indicated. By contrast, when key 17 is pressed, the current content to be output to monitor device 12, as indicated by arrow CR, is switched to the immediately adjacent data as seen in the downward direction DR. Furthermore, whenever key 17 is pressed, the content immediately adjacent to the current content, as seen downward, is indicated.

Thus a channel for digital broadcast signal DS is switched in upward and downward directions and digital content recorded in hard disk 32 selected by pressing keys 16 and 17 to switch and thus designate digital content to be output (S4). In response, digital information of the designated digital content is obtained (S5).

For example, if content with data D2 of "ON AIR" is designated, control portion 10 switches to tuner 4 an input to decoder 5 and supplies corresponding data D1 to tuner 4 to extract from digital broadcast signal DS a signal of a channel indicated in the corresponding data D1. Accordingly, tuner 4 tunes in accordance with data D1 received. If digital content with data D2 indicating "AUX input" is designated, control portion 10 switches to external I/F 14 an input to decoder 5 and provides corresponding data D1 to external I/F 14. Accordingly, external I/F 14 operates to take in an external input of a type indicated by data D1 received. If digital content with data D2 indicating "from HDD" is designated, control portion 10 switches the decoder 5 input to HD device 3 to provide corresponding data D1 to HD device 3. HD device 3 reads from hard disk 32 the digital content indicated by data D1 received.

Digital information of digital content thus obtained is output to monitor device 12. More specifically, digital information thus obtained is provided to and decoded by decoder 5 and output via video output portion 7 or audio output portion 8 to monitor device 12 in the form of the screen shown in FIG. 4A or 4B (S6).

Thus in the present embodiment a complicated operation can be eliminated and a user can perform a common operation of key 16 or 17 to go around (or switch) digital contents that can be viewed via monitor device 12, i.e., a variety of digital contents registered with channel map 31 (digital content provided by digital broadcast signal DS, digital content recorded in hard disk 32, digital content provided by an external input) to designate digital content. Furthermore, as digital content is switched to designate different digital content, digital tuner 1 automatically shifts to an operation allowing the user to view the designated digital content via monitor device 12 (i.e., automatic reproduction effected after a station is selected).

Note that the present invention is not limited to the configuration of the above described embodiment, and it is susceptible to a variety of variations. For example, the device reproducing digital content is not limited to HD device 3 or DVD reproduction device 2 and it may be a compact disc read only memory (CD-ROM) reproduction device and other similar, magneto-optical disc reproduction devices. Furthermore, the device recording and reproducing digital content is not limited to HD device 3 or DVD device 2, and it may be other devices capable of rapidly recording and reproducing a large capacity of digital data.

Furthermore, while as described herein, remote controller 11 is used to selectively designate content to be output to monitor device 12, digital tuner 1 may have a front panel (not shown) provided with a key corresponding in function to keys 16 and 17 so that a user can operate the front panel to issue instructions:

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcast reception apparatus comprising:
a broadcast receiver receiving a digital broadcast signal;
a recording medium having content previously recorded therein;
a content reader reading said content from said recording medium;
a switch operated to switch content to be output to a previously prepared monitor; and
a controller controlling switching content to be output, sequentially switching and selecting from a group of contents content to be output to said monitor whenever said switch is operated, said group of contents at least including content broadcast through each of at least one channel allowing said broadcast receiver to receive a corresponding said digital broadcast signal, and content recorded in said recording medium;
wherein the controlling, switching, and selecting is communicated to the digital broadcast reception apparatus by an up key and a down key disposed on the controller.

2. The digital broadcast reception apparatus of claim 1, further comprising a register having registered therewith identification information identifying each of at least one channel of said digital broadcast signal, and identification information identifying each of at least one content recorded in said recording medium, wherein:
said controller includes a selector, whenever said switch is operated said selector sequentially selecting said identification information in said register and outputting said identification information selected;
said broadcast receiver includes a broadcast content extractor, when said extractor receives said identification information from said selector said extractor extracting said digital broadcast signal received indicating content broadcast through said channel identified by received said identification information; and when
said content reader receives said identification information from said selector, said content reader reads from said recording medium said content identified by received said identification information.

3. The digital broadcast reception apparatus of claim 2, further comprising a monitor output portion receiving and outputting to said monitor said content extracted by said extractor or said content read by said reader from said recording medium.

4. The digital broadcast reception apparatus of claim 3, wherein when said monitor output portion outputs said content to said monitor, information specifying whether said content output has been extracted from said digital broadcast signal or read from said recording medium is output to said monitor.

5. The digital broadcast reception apparatus of claim 4, wherein said information specifying includes said identification information of said content being output to said monitor.

6. The digital broadcast reception apparatus of claim 5, wherein said recording medium includes a hard disk.

7. The digital broadcast reception apparatus of claim 5, wherein said recording medium includes a DVD.

8. The digital broadcast reception apparatus of claim 1, wherein said recording medium includes a hard disk.

9. The digital broadcast reception apparatus of claim 1, wherein said recording medium includes a DVD.

10. The digital broadcast reception apparatus of claim 1, said register having additional information registered therewith to identify said content externally supplied, the apparatus further comprising means for receiving external content, when said means receives said information from said controller said means selecting from externally supplied content identified by received said identification information, and outputting the selected content to said monitor.

11. A method of switching content output, comprising the steps of:
   receiving an instruction from an up key or a down key of a controller issued to switch content to be output to a monitor; and
   whenever said instruction is received in the step of receiving, sequentially switching in a group of previously prepared contents to select content to be output to said monitor, said group of contents including content broadcast through each of at least one channel capable of receiving a corresponding digital broadcast signal and content recorded in a recording medium.

* * * * *